(12) United States Patent
Asami et al.

(10) Patent No.: US 8,020,936 B2
(45) Date of Patent: Sep. 20, 2011

(54) AIRCRAFT SEAT

(75) Inventors: Bungo Asami, Kanagawa (JP); Kohei Suzuki, Tokyo (JP)

(73) Assignee: Koito Industries, Ltd., Kanagawa (JP)

( * ) Notice: Subject to any disclaimer, the term of this patent is extended or adjusted under 35 U.S.C. 154(b) by 1028 days.

(21) Appl. No.: 11/884,490

(22) PCT Filed: Feb. 27, 2006

(86) PCT No.: PCT/JP2006/303552
§ 371 (c)(1),
(2), (4) Date: Aug. 16, 2007

(87) PCT Pub. No.: WO2006/093072
PCT Pub. Date: Sep. 8, 2006

(65) Prior Publication Data
US 2010/0155536 A1 Jun. 24, 2010

(30) Foreign Application Priority Data
Mar. 1, 2005 (JP) .................................. 2005-056172

(51) Int. Cl.
*B60N 2/64* (2006.01)
(52) U.S. Cl. .......... 297/440.11; 297/188.04; 297/228.13
(58) Field of Classification Search ............. 297/188.04, 297/440.11, 452.14, 452.31, 452.36, 228.13
See application file for complete search history.

(56) References Cited

U.S. PATENT DOCUMENTS

| | | | |
|---|---|---|---|
| 3,182,377 A * | 5/1965 | Hoven et al. ................... 29/91.1 |
| 3,695,689 A * | 10/1972 | Barecki ..................... 297/188.07 |
| 4,088,367 A * | 5/1978 | Atkinson et al. ......... 297/452.14 |
| 4,498,702 A * | 2/1985 | Raftery ......................... 297/312 |
| 4,832,408 A * | 5/1989 | Bertsch et al. ........... 297/452.36 |
| 5,133,587 A | 7/1992 | Hadden, Jr. |
| 5,152,582 A * | 10/1992 | Magnuson ................. 297/440.2 |
| 5,292,174 A * | 3/1994 | Ohnuma ................. 297/188.07 |
| 5,407,248 A * | 4/1995 | Jay et al. .................... 297/284.1 |
| 5,951,110 A | 9/1999 | Conner et al. |
| 6,131,993 A * | 10/2000 | Pesta et al. ................ 297/188.04 |
| 6,142,561 A * | 11/2000 | Pesta et al. ................ 297/188.04 |
| 6,241,188 B1 | 6/2001 | Simpson et al. |
| 6,402,244 B1 | 6/2002 | Schonenberg et al. |
| 6,450,571 B1 * | 9/2002 | Canni et al. .............. 297/188.04 |

FOREIGN PATENT DOCUMENTS

| | | |
|---|---|---|
| CN | 1132540 C | 12/2003 |
| JP | 61-156552 | 9/1986 |
| JP | 2000-272597 | 10/2000 |
| JP | 2001-57916 | 3/2001 |
| JP | 2001-258681 | 9/2001 |
| WO | WO-02-32268 | 4/2002 |
| WO | WO-2004-009400 | 1/2004 |
| WO | WO-2005-073083 | 8/2005 |

* cited by examiner

*Primary Examiner* — Peter R. Brown
(74) *Attorney, Agent, or Firm* — Kubotera & Associates, LLC

(57) ABSTRACT

An aircraft seat which can receive the load of a sitting person with only a back plate member, using no seat back frame, thus eliminating the need for sacrificing the sitting space, which results from the existence of the seat back frame, and at the same time, allowing the weight of the seat to be reduced, is provided. The aircraft seat (1) on which an aircraft passenger is to sit comprises a seat back (10) made up of a back plate member (11) that a cushion (12) is installed onto a front face (11*a*) thereof for receiving the back of a sitting person, and a reinforcing member (13) which is disposed on the rear face (11*b*) of the back plate member (11) for reinforcing the back plate member (11), and said back plate member (11) is formed in the shape of a curved surface which enhances the surface rigidity.

3 Claims, 7 Drawing Sheets

F I G. 7
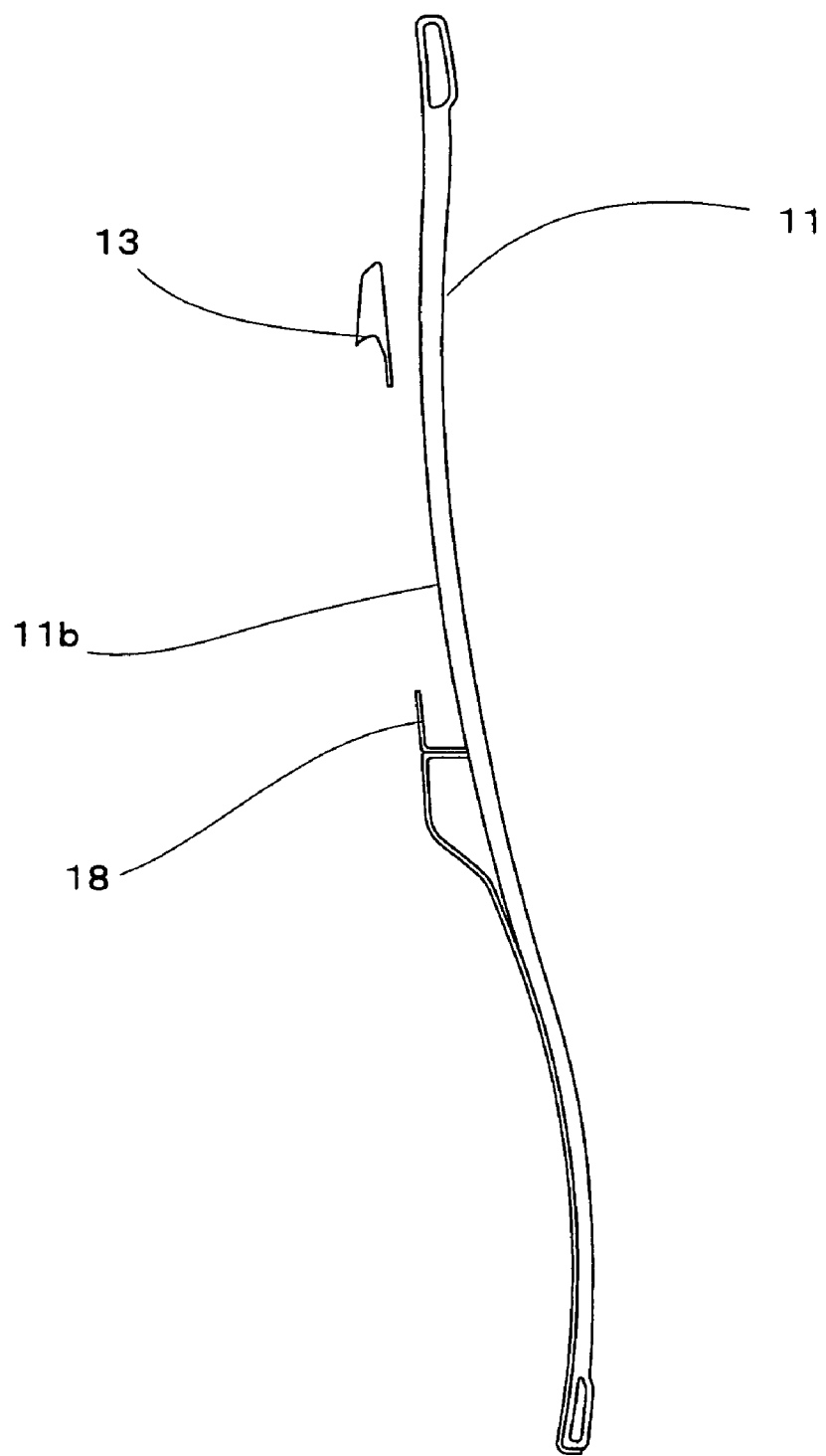

F I G. 8 (A)
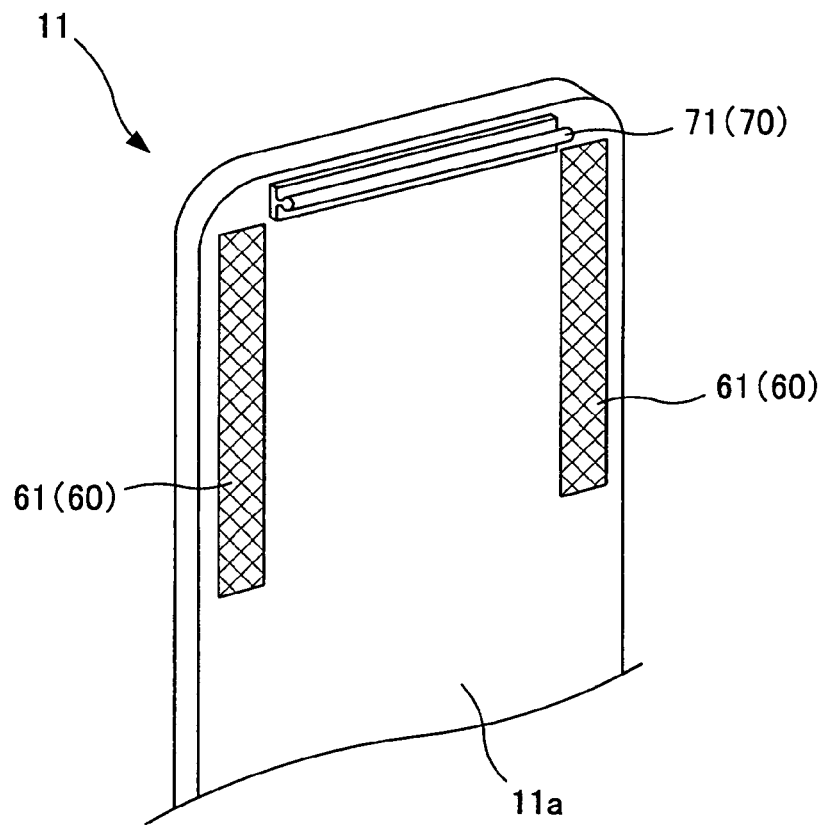
F I G. 8 (B)
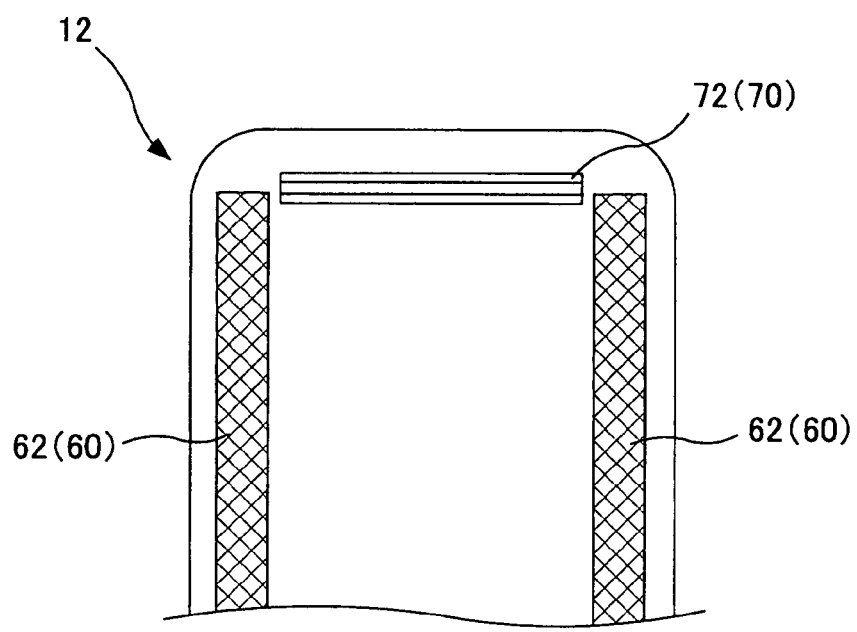

AIRCRAFT SEAT

TECHNICAL FIELD

The present invention relates to an aircraft seat on which an aircraft passenger is to sit.

BACKGROUND ART

Conventionally, a structure which is common to vehicle seats, such as aircraft seats and automobile seats, is stated in Japanese Patent Laid-Open Publication No. 2001-057916. With this structure, to a leg part which is to be fixed to the floor of a vehicle, a base frame is fixed, and thereto a bottom frame and a seat back frame are connected. To the bottom frame configured in this way, a bottom cushion on which a sitting person is to sit is mounted, and to the seat back frame, a seat back cushion which can receive the back of a sitting person is mounted. The seat back cushion is mounted to a back plate member, and the seat back frame is mounted such that it surrounds the side edge part and the upper edge part of the back plate member.

With the aircraft seat, the seat back frame is formed with a tube frame for reinforcing the back plate member. The load of a sitting person is received by this seat back frame through the back plate member.

DISCLOSURE OF THE INVENTION

However, such a prior art has provided the strength required to withstand the load of the sitting person by increasing the width of the seat back frame, and making the portion bulging toward the side of the sitting person larger. Therefore, in order to prevent the seat back frame from contacting the sitting person, and as a result, impairing the sitting feeling, a seat back cushion which has a thickness large enough to offset the step height difference between the seat back frame and the back plate member has been installed. However, there has been a problem that, from the viewpoint of the good sitting feeling which is to be obtained from the seat back cushion itself, the thickness may be unnecessarily large, with the sitting space being sacrificed or the weight of the seat being increased by the amount corresponding to the unnecessary thickness.

In addition, from the viewpoint of esthetic appearance of the seat back, the visible surfaces are covered with a surface cloth or a separately attached decorative panel, thus there has been a problem that the number of parts is increased, resulting from the covering.

Further, loading and unloading of such a seat back cushion and a surface cloth require complex operations, thus there has been a problem that the loading and unloading can take a considerable amount of man-hours.

The present invention has been made in view of such problems with which the prior art has encountered, and one purpose of the present invention is to provide an aircraft seat which can receive the load of a sitting person with only the back plate member, using no seat back frame, thus eliminating the need for sacrificing the sitting space, resulting from the existence of the seat back frame, and at the same time, allowing the weight of the seat to be reduced.

Further, another purpose of the present invention is to provide an aircraft seat which has allowed the number of parts to be reduced.

Further, a third purpose of the present invention is to provide an aircraft seat which allows easy loading and unloading of the seat back cushion on and from the back plate member.

In order to achieve the above objects, according to a first aspect of the present invention, an aircraft seat on which an aircraft passenger is to sit, comprising:
a seat back made up of a back plate member that a cushion is installed onto a front face thereof for receiving the back of a sitting person, and a reinforcing member which is disposed on a rear face of the back plate member for reinforcing strength of said back plate member,
wherein
said back plate member is formed in the shape of a curved surface which enhances the surface rigidity.

According to a second aspect of the present invention, the aircraft seat according to the first aspect, wherein said curved surface provides a geometry which maintains a sitting person at a comfortable posture.

According to a third aspect of the present invention, the aircraft seat according to the first or the second aspect, wherein said cushion is formed to have a geometry which is along said curved surface.

According to a fourth aspect of the present invention, the aircraft seat according to the first, the second or the third aspect, wherein a void between said reinforcing member and the rear face of said back plate member is formed as a pocket.

According to a fifth aspect of the present invention, the aircraft seat according to the first, the second, the third or the fourth aspect, wherein said back plate member has a side edge part which is formed by bending the side edge thereof forward or rearward continuously from said front face as an integral part, and the inside of the side edge part is hollow.

According to a sixth aspect of the present invention, the aircraft seat according to the fifth aspect, wherein the geometry of the cross section of the hollow inside of said side edge part changes continuously.

According to a seventh aspect of the present invention, the aircraft seat according to the first, the second, the third the fourth, the fifth or the sixth aspect, comprising:
an installing member which allows said cushion to be removably installed onto the front face of said back plate member, wherein said installing member is made up of a first component thereof which is provided on the front face of said back plate member, and a second component thereof which is provided on said cushion, and with the second component seizing said first component, said cushion is installed onto the front face of said back plate member.

Said the present invention will function as follows: With the seat back of the aircraft seat, a cushion for receiving the back of a sitting person is installed onto the front face of the back plate member which is formed of a hard resin, and on the rear face of the back plate member, a reinforcing member is provided.

The curved surface geometry which has been provided for the back plate member exerts an effect of enhancing the surface rigidity of the back plate member. Thereby, the need for reinforcing the back plate member with a seat back frame is eliminated, and the back plate member can be made thinner. Conventionally, by making the cushion thicker, the step height difference between the seat back frame and the back plate member has been offset, however, because there is no seat back frame, the cushion can provide only the original function as a cushion with a minimum thickness required. As a result of this, the entire seat back can be made thinner, thus the sacrifice of the sitting space that results from the thickness of the seat back is minimized, which allows the sitting space to be expanded. In addition, the weight of the seat back can be reduced. Further, the curved surface of the back plate member can be formed such that it also has a geometry which gives a comfortable feeling to the sitting person on the basis of the ergonomics.

With the cushion which is to be installed onto the front face of the back plate member, the surface which is to be butted against the back plate member is formed to have a geometry which is along said curved surface of the back plate member, which makes installation onto the back plate member easier and allows said curved surface to effectively give a comfortable feeling. Further, the surface of the cushion that directly receives the back of a sitting person may also be adapted to have a curved surface geometry which is along the curved surface geometry of said back plate member, which could bring about a still more comfortable feeling.

On the front face of the back plate member and the installation face of the cushion onto the front face, an installing member for removably installing the cushion onto the front face of the back plate member is provided. Examples of the installing member include a hook and pile fastener, such as the Velcro Tape (a registered trade name) which is attached to the installation face of the cushion and the front face of the back plate member, or the like. Alternatively or in addition to this, a fitting member which components are formed to have a mutually fitting configuration may be mounted on the installation face of the cushion and the front face of the back plate member. The cushion may also be a thin one, is lightweight, and is easily removable with said installing member.

The reinforcing member which is provided on the rear face of the back plate member serves to reinforce the strength of the back plate member, and it may be formed as an integral part of the back plate member, or may be formed as an unintegral part to be mounted to the rear face. Because the back plate member is reinforced by this reinforcing member, the thickness thereof can be still more decreased.

In addition, this reinforcing member is made up of a side part which is bulged from both sides of the rear face of the back plate member, respectively, toward the rear seat, and a front part which, from this side part, continuously extends along the rear face of said back plate member to form a prescribed void between it and the rear face. The upper edge part of this reinforcing member forms an upward-directed opening between it and the rear face of the back plate member. On the other hand, the lower end part of the reinforcing member is at least partially closed. Thereby, said void which is formed by the reinforcing member and the rear face of the back plate member can be utilized as a pocket. This pocket has an opening which is directed upward, thus, even a relatively long article, such as a magazine, a newspaper, or the like, can be easily put in and taken out by one hand.

With the aircraft seat, a table for use by a sitting person on the rear seat is provided on the rear face of the seat back, and the reinforcing member is located above the level of the table which is in service. The table which is not in service can be held in the state that the article resting face is butted against the front part of the reinforcing member.

The back plate member may have a side edge part which is formed by bending the side edge thereof forward or rearward continuously from the front face as an integral part, and the side edge part may be formed to be hollow. Thereby, the strength of the back plate member is further improved, and because the side edge part is hollow, the increase in weight of the back plate member can be held to a minimum.

In addition, by the nature of the composite material, such as a GFRP (Glass Fiber)/CFRP (Carbon Fiber) one, or the like, the surface of the back plate member is resinous, thus depending upon the way of surface treatment of a visible portion, such as the rear face, or the like, the need for covering with a surface cloth, a decorative panel, or the like, can be eliminated. Thereby, the number of parts can be reduced, and the need for installation working for a surface cloth, a decorative panel, or the like, can be eliminated.

BRIEF DESCRIPTION OF THE DRAWINGS

FIG. 7 is a longitudinal section of the aircraft seat pertaining to the one embodiment of the present invention;

FIG. 8(A) and FIG. 8(B) are explanatory drawings for an example of arrangement of the components of installing members for installing a cushion onto a back plate member of the aircraft seat pertaining to the one embodiment of the present invention, FIG. 8(A) illustrating the front face of the back plate member, and FIG. 8(B) illustrating the installation face of the cushion.

BEST MODE FOR CARRYING OUT THE INVENTION

Hereinbelow, a preferred embodiment of the present invention will be described with reference to the drawings. The respective drawings from FIG. 1 to FIG. 9(B) illustrates one embodiment of the present invention.

Figure 1:
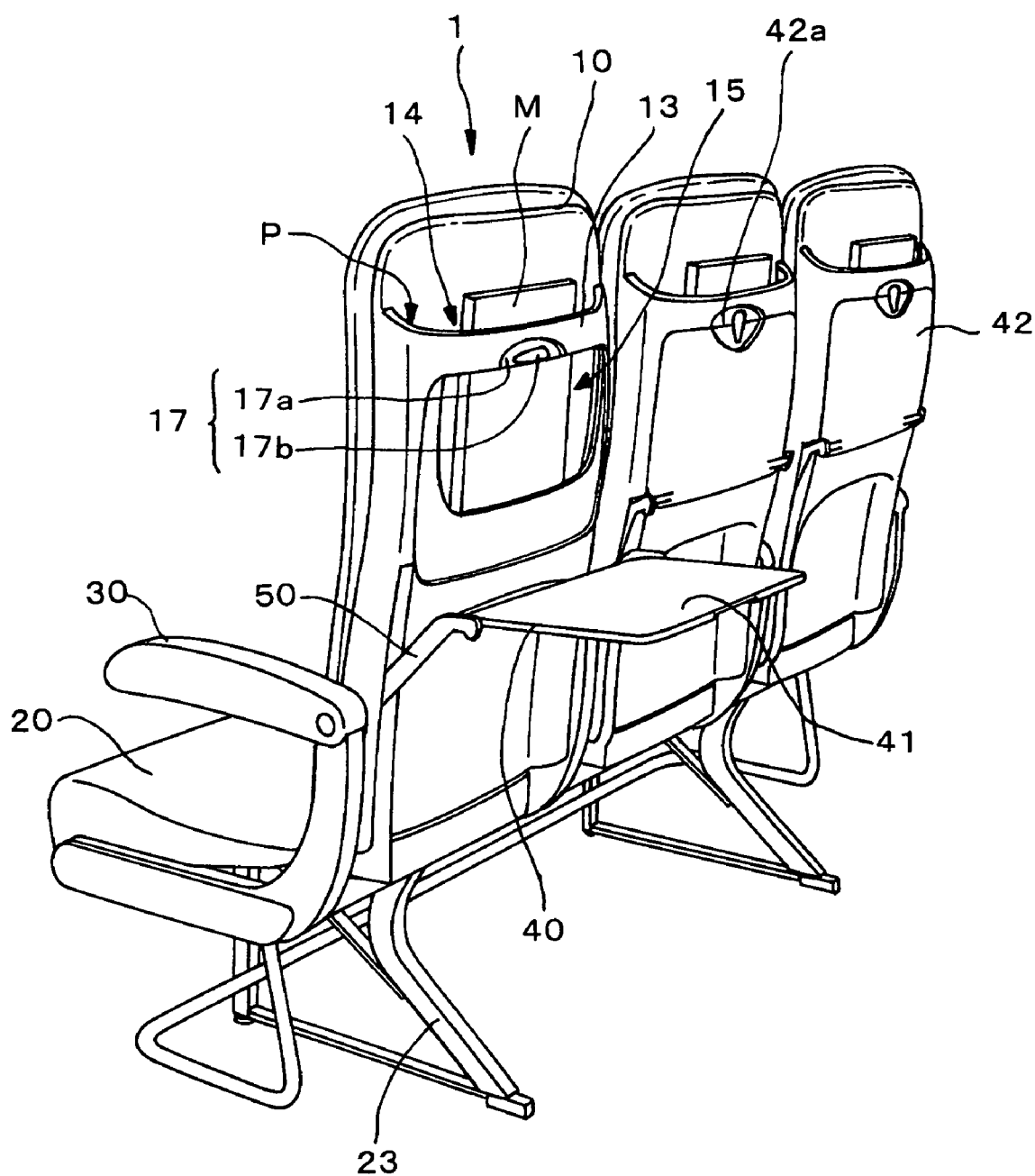
FIG. 1 is a perspective view illustrating an aircraft seat pertaining to one embodiment of the present invention.
Figure 2:
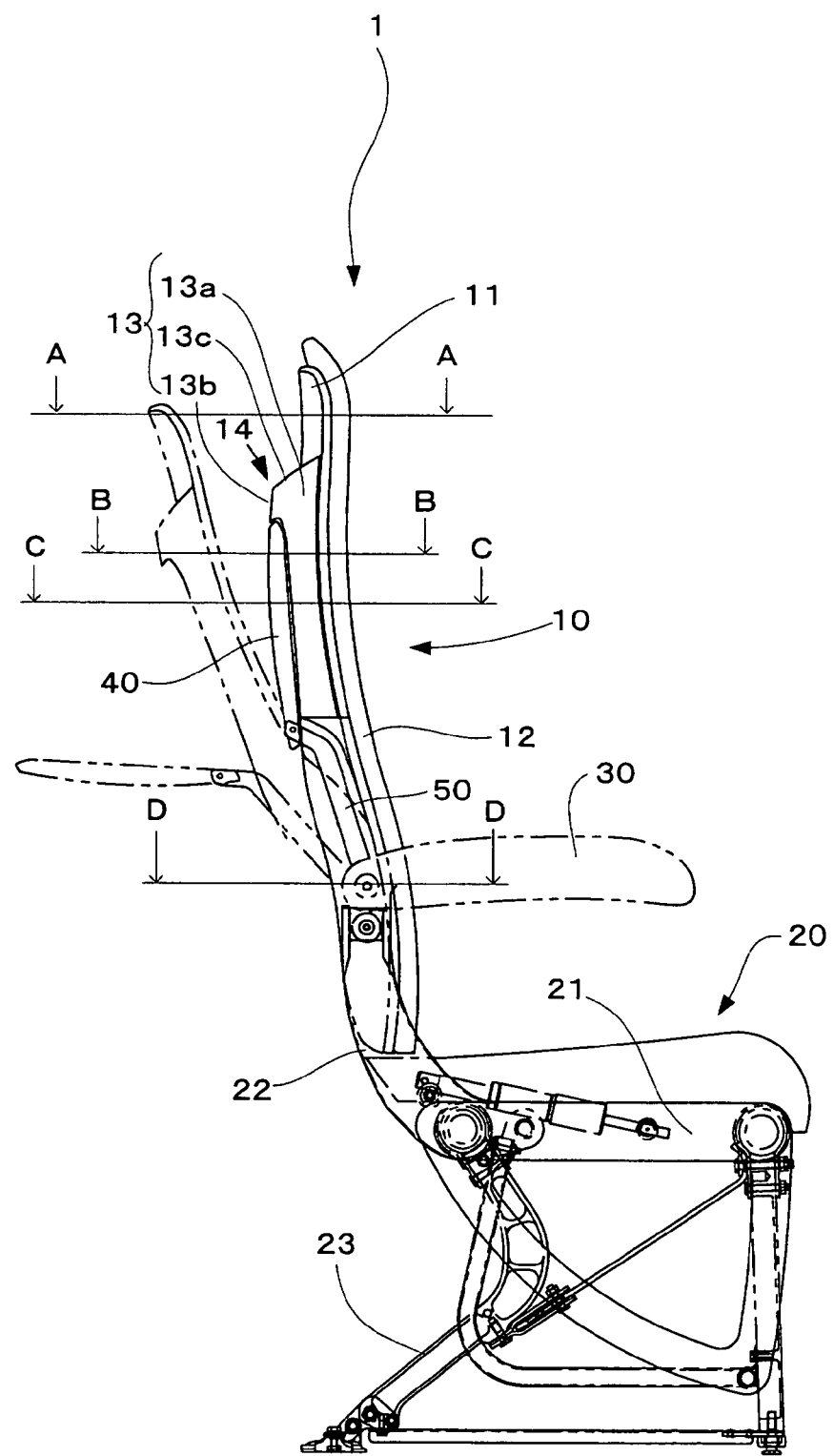
FIG. 2 is a side view illustrating the aircraft seat pertaining to the one embodiment of the present invention.

FIG. 1 is a perspective view of a three-person capacity aircraft seat that three aircraft seats are connected, pertaining to the present embodiment, when viewed from oblique rear, and FIG. 2 is a side view of the aircraft seat pertaining to the present embodiment.

The aircraft seat 1 is made up of a seat back 10, a seat bottom 20, an armrest 30, a table 40, and the like. The seat bottom 20 is provided on a bottom frame 21. This bottom frame 21 is connected to a base frame 22. This base frame 22 is supported by a leg part 23, and this leg part 23 is installed onto the floor of a passenger cabin of an aircraft.

The seat back 10 is made up of a back plate member 11 which is formed of a hard resin, a cushion 12 which is installed onto a front face 11a of the back plate member 11, and a reinforcing member 13 which is provided on a rear face 11b of the back plate member 11. The back plate member 11 is inclinably connected to the base frame 22.

Figure 3:
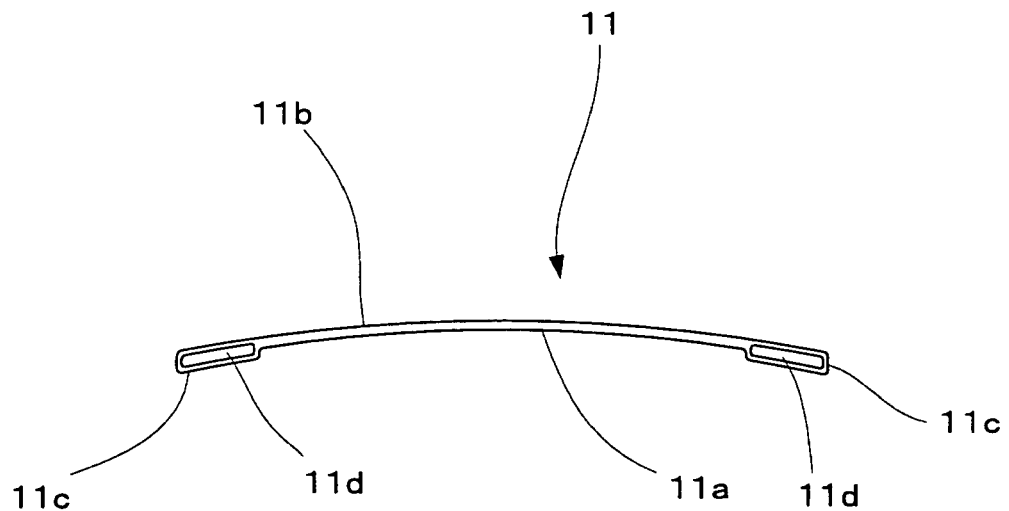
FIG. 3 is a section taken on line A-A in FIG. 2.
Figure 4:
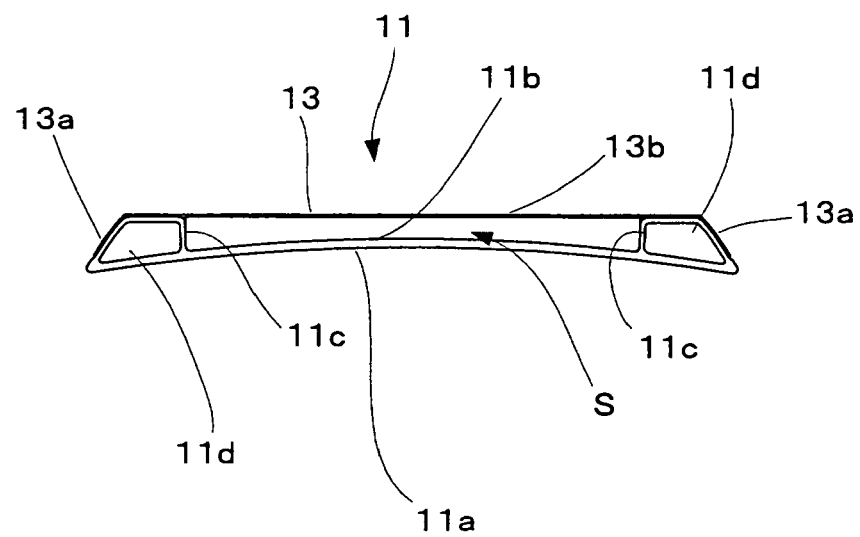
FIG. 4 is a section taken on line B-B in FIG. 2.
Figure 5:
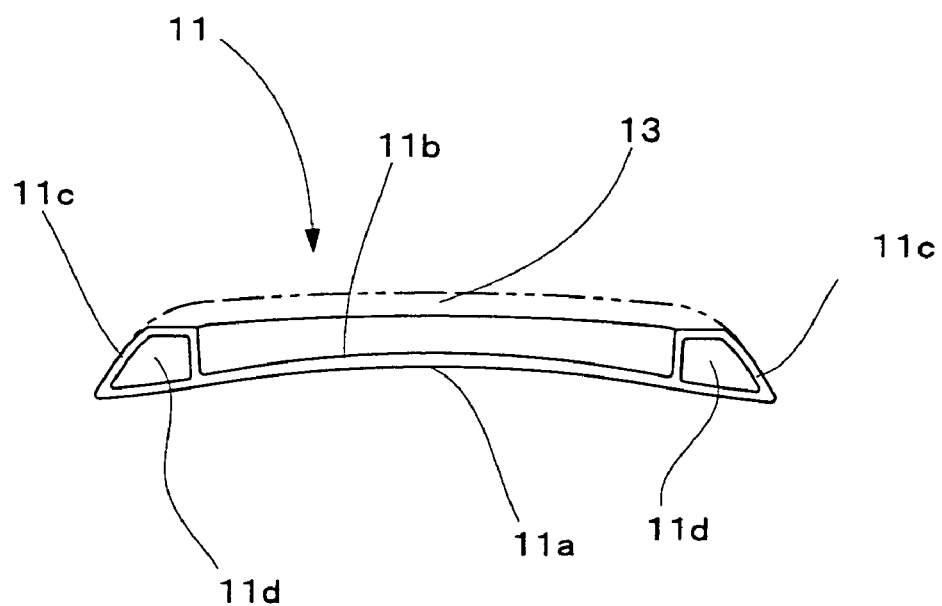
FIG. 5 is a section taken on line C-C in FIG. 2.
Figure 6:
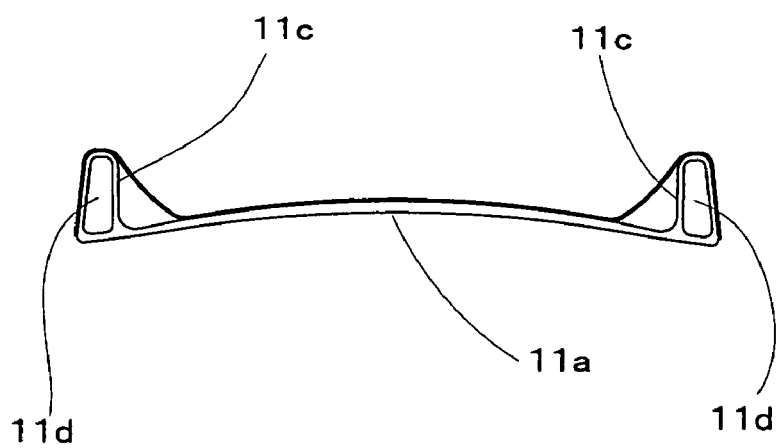
FIG. 6 is a section taken on line D-D in FIG. 2.
Figure 9:
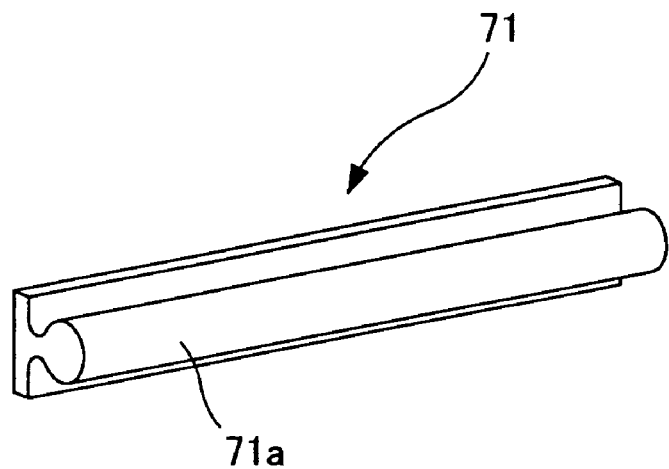
FIG. 9(A) and FIG. 9(B) are enlarged figures illustrating one of the components of the installing members as shown in FIG. 8(A) and FIG. 8(B), respectively, FIG. 9(A) illustrating one of the components of the installing members that are provided on the front face of the back plate member, and FIG. 9(B) illustrating one of the components of the installing members that are provided on the installation face of the cushion.
Figure 9:
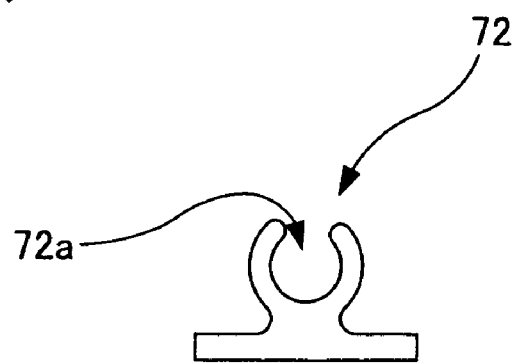

The back plate member 11 is formed of, for example, a hard resin, and in order to enhance the surface rigidity, is formed in the shape of a curved surface. In addition, the visible rear face 11b, and the like, are provided with a surface treatment, such as embossing, which eliminates the need for using a surface cloth, a decorative design panel, or the like, for covering. Therefore, the need for installing a surface cloth, a decorative design panel, or the like, can be eliminated to reduce the number of parts, which allows making the seat back 10 lightweight, and the manufacturing process simpler. FIG. 3 to FIG. 6 illustrate cross sections of the back plate member 11, respectively, and FIG. 3 is a section taken on line A-A in FIG. 2; FIG. 4 is a section taken on line B-B in FIG. 2; FIG. 5 is a section taken on line C-C in FIG. 2; and FIG. 6 is a section taken on line D-D in FIG. 2. In addition, FIG. 7 is a longitudinal section of the back plate member 11.

FIG. 3 illustrates a cross section of a portion of the back plate member 11 that is above the reinforcing member 13 and close to the uppermost portion. The whole is curved such that it is slightly warped toward the side of the rear face 11b. Both of side edge parts 11c of the back plate member 11 are slightly bulged from the front face 11a of the back plate member 11, the inside of the respective side edge parts 11c being made hollow. This side edge part 11c provides an effect of improving the strength of the back plate member 11.

FIG. 4 illustrates a section of a portion located lower than the level of the section as illustrated in FIG. 3. At this level, a smooth curved surface is formed from the side edge part 11c on one side of the front face 11a to the side edge part 11c on the other side thereof, and in the same manner as at the level as indicated in FIG. 3, the whole is curved such that it is slightly warped toward the side of the rear face 11b. The side edge part 11c is bulged toward the side of the rear face 11b unlike that at the level as indicated in FIG. 3. The hollow part 11d of the side edge part 11c is larger than that at the level as indicated in FIG. 3. The side edge part 11c provides an effect of improving the strength of the back plate member 11.

The reinforcing member 13 is provided such that it covers the side edge parts 11c. The reinforcing member 13 is formed as a part unintegral with the back plate member 11, being made up of both of side parts 13a, 13a which cover the side edge parts 11c, and a front part 13b which continuously extends from both of the side parts 13a, 13a to form a spacing S between it and the rear face 11b of the back plate member 11. The spacing S is used as a pocket P as described later.

FIG. 5 illustrates a section of a portion located lower than the level of the section as illustrated in FIG. 4. Also at this level, the whole is curved such that it is slightly warped toward the side of the rear face 11b. In addition, the side edge part 11c and the hollow part 11d are made larger, with the spacing S being made still larger.

FIG. 6 illustrates a section of a portion located lower than the level of the section as illustrated in FIG. 5 and at substantially the same level of the armrest 30. Also at this level, the whole is curved such that it is slightly warped toward the side of the rear face 11b. In addition, the geometry of the side edge part 11c is changed into that which is bulged slenderly toward the rear. At this level, a portion is provided which continues to the reinforcing member 13, but there is no spacing S between that portion and the front face 11a of the back plate member 11, and thus, no pocket P is produced.

As described above, the side edge part 11c and the hollow part 11d as shown in FIG. 3 to FIG. 6 are continuously changed in the geometry of the cross section. As stated above, the back plate member 11 has a strength which is further improved by the side edge parts 11c, however, in the inside of the side edge parts 11c, a hollow part 11d is formed, thus the increase in weight of the seat back 10 is extremely small.

As shown in FIG. 7, the longitudinal section of the back plate member 11 is formed as a curved surface in the shape of a letter S that is extremely gradually changed. The curved surface geometry as indicated by this longitudinal section, and the curved surface geometries as indicated by said cross sections enhance the surface rigidity of the back plate member 11. Further, the back plate member 11 is ergonomically formed to have a geometry which allows a sitting person to obtain a comfortable feeling. The upper end part and the lower end part of the back plate member 11 are formed to be hollow, respectively. Thereby, weight reduction is achieved. In the central part of the rear face 11b, a flange 18 is provided. This flange 18 is located where it supports the lower part of the reinforcing member 13, forming a bottom part of the pocket P. The flange 18 may fully block the lower part of the reinforcing member 13, or block to such a degree that the articles contained in the pocket P will not be dropped off.

The location where said reinforcing member 13 is formed is at a level higher than the table 40 being in service, which is indicated with alternate long and two short dashes lines in FIG. 1 and FIG. 2.

The pocket P has a depth which is deep enough to vertically contain a magazine M. A putting-in and taking-out opening 14 for putting articles in and taking them out of the pocket P is formed so as to be directed upward by the rear face 11b of the back plate member 11 and an upper edge part 13c of the reinforcing member 13. This putting-in and taking-out opening 14 is formed into an oblong opening along the rear face 11b.

As can be seen from the figure, in the space which is provided by upward extending this putting-in and taking-out opening 14, no member, and the like, which hinder an article from being put in and taken out of the pocket P are disposed, and thus an open space is given. In the side part 13a, the upper edge part 13c is gradually inclined downward from the rear face 11b of the back plate member 11. Therefore, the opening plane of the putting-in and taking-out opening 14 is gradually inclined downward from the rear face 11b of the back plate member 11. Consequently, even when the seat back 10 is in the upright state, the sitting person on the rear seat can view the putting-in and taking-out opening 14, which allows that person to putting articles in and taking them out of the pocket P easily.

The reinforcing member 13 is provided with a taking-out opening 15 in the front part 13b. The lower edge part of the taking-out opening 15 is at a level higher than the bottom part of the pocket P. Also from this taking-out opening 15, articles can be put in and taken out of the pocket P. This taking-out opening 15 can be blocked by the table 40 not being in service. The table 40 is freely rotatably pivoted at the rear end thereof, being held between the tip ends of two arms 50 which basal ends are freely rotatably pivoted. At the time when the table 40 is not in service, a resting face 41 for articles thereof can be caused to be held, being positioned along the front part 13b of the reinforcing member 13. In the peripheral edge part of the taking-out opening 15, a recess is formed such that, when the table 40 is held, practically no step height differences are produced between a rear face 42, which is on the opposite side of the resting face 41, and the surface of the front part 13b. When the table 40 is accommodated in this recess, it is held such that a feeling of integrity between it and the reinforcing member 13 is created.

In the front part 13b of the reinforcing member 13, a table holding part 17 for holding the table 40 is provided in the vicinity of the putting-in and taking-out opening 14. The table holding part 17 is made up of a concave part 17a which is slightly recessed from the surface of the reinforcing member 13, and a rotating member 17b which is freely rotatably provided in the concave part 17a.

On the other hand, also in the rear face 42 of the table 40, a concave part 42a which is slightly recessed is provided. When the table 40 is positioned where it is held to be along the front part 13b, the concave part 42a and the concave part 17a of the table holding part 17 are made substantially flush with each other, thus by turning the rotating member 17b in order to cause a part of the rotating member 17b to be engaged with the concave part 42a, the table 40 can be held.

As shown in FIG. 8(A) and FIG. 8(B), on the front face 11a of the back plate member 11, two different types of installing member 60, 70 to removably install the cushion 12 are provided. The respective installing members 60, 70 may be of any configuration, provided that they are a pair of members which can seize or fit to each other. In an example as shown in the figure, the installing member 60 is a hook and pile fastener 60, and another installing member 70 is a fitting rail 70 which components fit to each other.

The hook and pile fastener 60 is made up of a pair of components, i.e., a first tape 61 (a first component) that a number of hook-like parts are formed over substantially the entire surface of the front face, and a second tape 62 (a second component) that a number of pile-like parts are formed over substantially the entire surface of the front face. When these first tape 61 and second tape 62 are tightly contacted with each other, the hook-like part and the pile-like part seize each other. As shown in the figure, the first tape 61 is attached in the longitudinal direction (vertical direction) of the back plate member 11 along both sides of the front face 11a, and the second tape 62 is attached in the longitudinal direction (vertical direction) of the cushion 12 along both sides of the installation face of the cushion 12. Provided that a combination of the first tape 61 with the second tape 62 is used as the hook and pile fastener 60, either of the first tape 61 and the second tape 62 may be mounted to the front face 11a or the installation face of the cushion 12.

The fitting rail 70 is made up of a pair of components, i.e., a convex rail 71 that a convex part 71a extends in the longitudinal direction, as shown in FIG. 9(A), and a concave rail 72 that a concave part 72a extends in the longitudinal direction as shown in FIG. 9(B), and the convex part 71a and the concave part 72a fit to each other. The convex rail 71 is mounted to the upper end part of the front face 11a in the lateral direction, and the concave rail 72 is mounted to the upper end part of the installation face of the cushion 12 in the lateral direction. So long as a combination of the convex rail 71 with the concave rail 72 is used as the fitting rail 70, either of the convex rail 71 and the concave rail 72 may be mounted to the front face 11a or the installation face of the cushion 12.

In order to facilitate attaching the cushion 12 to the front face 11a, and also to ensure that the effect of the curved surface geometry formed in the back plate member 11 giving a comfortable feeling to the sitting person will not be cancelled by the cushion 12, the installation face thereof may be formed such that it is along the curved surface geometry of the front face 11a. Further, the geometry of the entire cushion 12 may be adapted to be that which is along the curved surface geometry of the front face 11a.

Next, the function of the present invention will be described.

With the aircraft seat 1 of the present invention, the cushion 12 is installed onto the front face 11a of the back plate member 11, and on the rear face 11b, the reinforcing member 13, which is unintegral with the back plate member 11, is fixedly installed. The reinforcing member 13 is disposed in a location where the lower end part thereof is supported by the flange 18. In order to install the cushion 12 onto the front face 11a, one end of the concave part 72a of the concave rail 72 mounted to the upper end part of the installation face of the cushion 12 is fitted to the convex part 71a of the convex rail 71 mounted to the upper part of the front face 11a at one end thereof, and is slid to fit the entire concave part 72a to the convex part 71a. Thereafter, the cushion 12 is aligned to the front face 11a, and the first tape 61 attached to the front face 11a and the second tape 62 attached to the cushion 12 can be caused to be tightly contacted with each other for their seizing each other.

By forming the installation face of the cushion 12 such that it is along the curved surface geometry of the rear face 11b, said installation working can be made easier. In addition, even in the case that the thickness of the cushion 12 is decreased, the comfortable feeling which is brought about by the curved surface geometry of the front face 11a can be provided without being impaired.

Because, as described above, the back plate member 11 is provided with an improvement in surface rigidity by making the surface curved, and with a reinforcement by the reinforcing member 13, the back plate member 11 can be made thinner and the need for using a seat back frame for reinforcement is eliminated. Therefore, there is no need for offsetting the step height difference between the back plate member 11 and the seat back frame by increasing the thickness of the cushion 12, thus the cushion 12 can provide only the original function as a cushion, having a minimum thickness required. As a result of this, the entire seat back 10 can be made thinner, and the sitting space can be expanded. In addition, the weight of the seat back 10 can be reduced, and the number of parts can be reduced.

The putting-in and taking-out opening 14 of the pocket P which is formed on the rear face 11b of the back plate member 11 is directed upward, and above the putting-in and taking-out opening 14, there is nothing which hinders an article from being put in and taken out through the putting-in and taking-out opening 14, thus an article can be easily put in and taken out by one hand. In addition, even a relatively long article, such as a magazine or a folded newspaper can be placed straight into the pocket P from above without being bent halfway. Further, the opening plane of the putting-in and taking-out opening 14 is gradually inclined downward from the rear face 11b of the back plate member 11, thus the opening area is wide, and the sitting person on the rear seat can directly view the putting-in and taking-out opening 14, which makes it easier to put articles in and take them out of the pocket P.

The table 40 which can be held in the front part 13b of the reinforcing member 13 will have no influence on the operation of putting-in and taking-out of an article through the putting-in and taking-out opening 14, in either of the held state that it is held in the holding position, not being in service, and the servicing state that it is turned downward from the holding position to the front of the sitting person on the rear seat for service. When the table 40 is brought into the servicing state, the taking-out opening 15 formed in the front part 13b of the reinforcing member 13 is exposed in front of the sitting person, thus through this taking-out opening 15, an article can be put in and taken out of the pocket P.

In said embodiment, no seat back frame, which is bulged from both sides of the back plate member 11 toward the front face 11a, is provided, however, the side edge may be bent forward continuously from the front face 11a as an integral part to form a side edge part which inside is hollow, whereby the strength of the back plate member 11 is enhanced. In addition, the side edge part may be formed such that the body sides of the sitting person are supported.

In addition, the reinforcing member 13 may be formed as an integral part of the back plate member 11.

In the present embodiment, an example of using two different types of installing member, i.e., the hook and pile fastener 60 and the fitting rail 70, is given, however, only one of them may be used.

In addition, the installing member is not limited to said examples, provided that the components thereof have a configuration for fitting to each other, or seize each other.

INDUSTRIAL APPLICABILITY

According to the aircraft seat pertaining to the present invention, the back plate member is formed in the shape of a curved surface, resulting in the surface rigidity being enhanced, and in addition, the strength of the back plate member is reinforced by means of the reinforcing member, whereby mainly the back plate member can receive the load imposed thereon by a sitting person, thus the need for using a seat back frame to reinforce the strength of the back plate member is eliminated, which allows the seat back to be rendered slim. As a result of this, the sacrifice of the sitting space that results from the thickness of the seat back is minimized, thus the sitting space can be enlarged. Further, the weight of the seat can be reduced with the number of parts being reduced, which leads to reduction in the manufacturing cost.

In addition, it is preferable that, as with the aircraft seat pertaining to the present invention, the curved surface of the back plate member have a geometry which can maintain the sitting person at a comfortable posture; thereby an effect of bringing about a comfortable posture is exerted, even if the cushion is thinned, thus by thinning the cushion, the seat back can be rendered still slimmer, which makes it possible to further enlarge the sitting space.

In addition, it is preferable that, as with the aircraft seat pertaining to the present invention, the cushion be formed to have a geometry which is along the curved surface of the back plate member; thereby the installation of the cushion onto the back plate member is facilitated, and the comfortable feeling can be brought about by the curved surface of the back plate member as it is, which provides a more comfortable seat.

Further, with the aircraft seat pertaining to the present invention, the void between the reinforcing member and the rear face of the back plate member is formed as a pocket, and the opening for putting articles in and taking them out of this pocket is directed upward, thus even a relatively long article, such as a magazine, a newspaper, or the like, can be easily put in and taken out by one hand.

In addition, as with the aircraft seat pertaining to the present invention, the side edge of the back plate member may be bent forward or rearward continuously from the front face as an integral part to form a side edge part, and the side edge part may be formed to be hollow; thereby, the strength of the back plate member can be further improved, and because the side edge part is hollow, the increase in the weight of the back plate member can be held to a minimum.

In addition, it is preferable that, as with the aircraft seat pertaining to the present invention, an installing member for removably installing the cushion onto the front face of the back plate member be provided, and with the installing member, a first component thereof provided on the front face of the back plate member and a second component thereof provided on the cushion seize each other, thus the cushion can be installed onto the front face of the back plate member, and the seizure can be cancelled for easily separating the cushion from the back plate member.

What is claimed is:

1. An aircraft seat on which an aircraft passenger is to sit, comprising:
    a seat back formed of a back plate member having a cushion installed onto a front face thereof for receiving a back of a sitting person, and a reinforcing member disposed on a rear face of the back plate member for reinforcing strength of the back plate member,
    wherein said back plate member is formed in a shape having a curved surface for increasing surface rigidity, said curved surface providing a geometry for maintaining a comfortable posture of the sitting person,
    wherein said cushion is formed in a shape extending along the curved surface so that a space between the reinforcing member and the rear face of the back plate member is formed as a pocket, and said back plate member has a side edge part having a side edge continuously and integrally bent from the front face forward or rearward, said side edge part having a hollow inside,
    wherein said back plate member includes a first installing member disposed at an upper side thereof, said cushion including a second installing member for engaging the first installing member,
    wherein said first installing member is formed of a convex rail protruding from the front face said second installing member being formed of a concave rail fitted into the convex rail.

2. The aircraft seat of claim 1, wherein said hollow inside of the side edge part has a cross section having a continuously changing shape.

3. The aircraft seat of claim 1, wherein said back plate member has the curved surface curved toward the reinforcing member, said reinforcing member being curved away from the back plate member.

* * * * *